US009025034B2

(12) United States Patent
Haraguchi et al.

(10) Patent No.: US 9,025,034 B2
(45) Date of Patent: May 5, 2015

(54) IMAGE BLUR CORRECTION UNIT, IMAGE BLUR COMPENSATION DEVICE, AND OPTICAL APPARATUS

(75) Inventors: Yoshimasa Haraguchi, Kanagawa (JP); Mitsuru Shinohara, Kanagawa (JP)

(73) Assignee: Alpha Labo Solution, Ltd., Kawasaki-shi (JP)

( * ) Notice: Subject to any disclaimer, the term of this patent is extended or adjusted under 35 U.S.C. 154(b) by 93 days.

(21) Appl. No.: 13/992,141

(22) PCT Filed: Dec. 2, 2011

(86) PCT No.: PCT/JP2011/078497
§ 371 (c)(1),
(2), (4) Date: Aug. 19, 2013

(87) PCT Pub. No.: WO2012/077772
PCT Pub. Date: Jun. 14, 2012

(65) Prior Publication Data
US 2013/0329065 A1 Dec. 12, 2013

(30) Foreign Application Priority Data

Dec. 6, 2010 (JP) .................................. 2010-271915
Sep. 30, 2011 (JP) .................................. 2011-217712

(51) Int. Cl.
*H04N 5/228* (2006.01)
*H04N 5/232* (2006.01)
(Continued)

(52) U.S. Cl.
CPC .............. *H04N 5/23287* (2013.01); *G03B 5/00* (2013.01); *G03B 5/06* (2013.01); *H04N 5/2328* (2013.01); *H04N 5/23283* (2013.01)

(58) Field of Classification Search
CPC ....................... H04N 5/23287; H04N 5/23283

USPC ........................................ 348/208.11; 396/55
See application file for complete search history.

(56) References Cited

U.S. PATENT DOCUMENTS

| 6,631,042 B2 * | 10/2003 | Noguchi ....................... 359/823 |
| 2005/0276172 A1 | 12/2005 | Tsutsumi |

(Continued)

FOREIGN PATENT DOCUMENTS

| JP | 60 27278 | 2/1985 |
| JP | 63 169614 | 7/1988 |

(Continued)

OTHER PUBLICATIONS

International Search Report Issued Jan. 17, 2012 in PCT/JP11/78497 Filed Dec. 2, 2011.

*Primary Examiner* — Twyler Haskins
*Assistant Examiner* — Quang Le
(74) *Attorney, Agent, or Firm* — Oblon, McClelland, Maier & Neustadt, L.L.P.

(57) ABSTRACT

An image blur compensation unit and image blur compensation device that can be made smaller in size. Wedge prisms, which refract light that is guided to an imaging element after passing through a lens group, are disposed on the same plane perpendicular to a central axis, and are supported by rotatable prism support portions. In order for the wedge prisms to be spaced by a predetermined distance and face each other along the central axis in a space that is formed when being placed adjacent to each other, the prism support portion supports the wedge prism on one end side along the central axis, and the prism support portion supports the wedge prism on one end side along the central axis. In this manner, the prism support portions supporting the wedge prisms, which need to be disposed along the central axis so as to be spaced by a predetermined distance and face each other, are disposed on the same plane. Therefore, the central axis-direction thickness can be made thinner, and the device can be made smaller in size.

4 Claims, 8 Drawing Sheets

(51) Int. Cl.
*G03B 5/00* (2006.01)
*G03B 5/06* (2006.01)

(56) References Cited

U.S. PATENT DOCUMENTS

2009/0175608 A1 7/2009 Otake
2011/0182566 A1* 7/2011 Watanabe ................ 396/55
2012/0081559 A1* 4/2012 Sato ..................... 348/208.11

FOREIGN PATENT DOCUMENTS

| | | |
|---|---|---|
| JP | 4 352124 | 12/1992 |
| JP | 2006 3421 | 1/2006 |
| JP | 2008 70770 | 3/2008 |
| WO | 2007 141986 | 12/2007 |

* cited by examiner

6 Image blur compensation mechanism

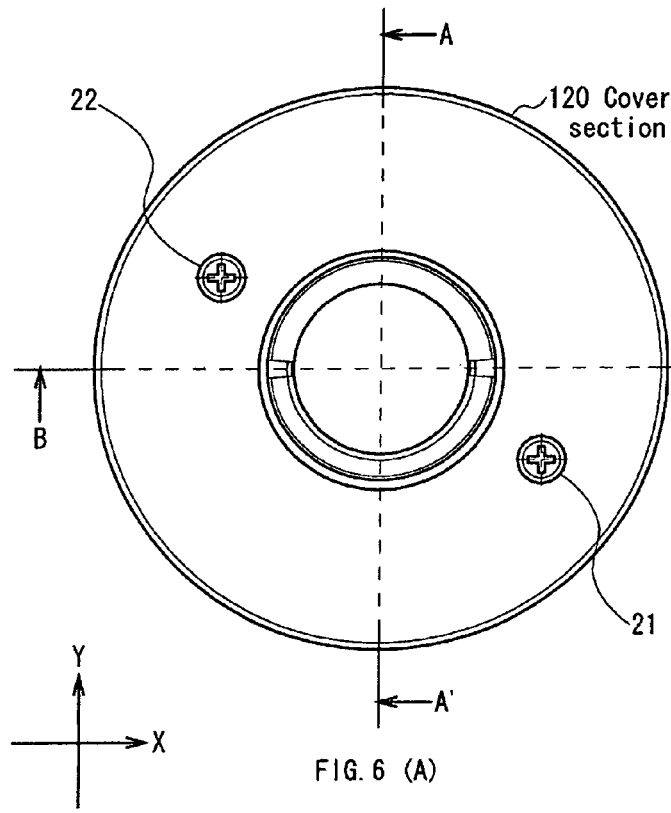
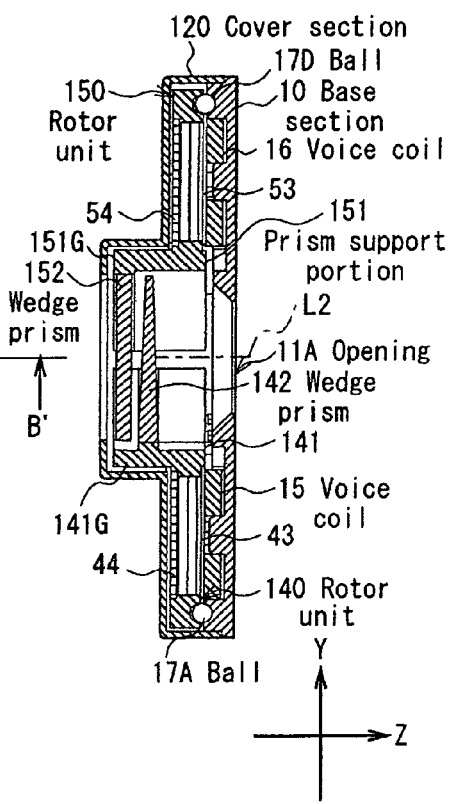
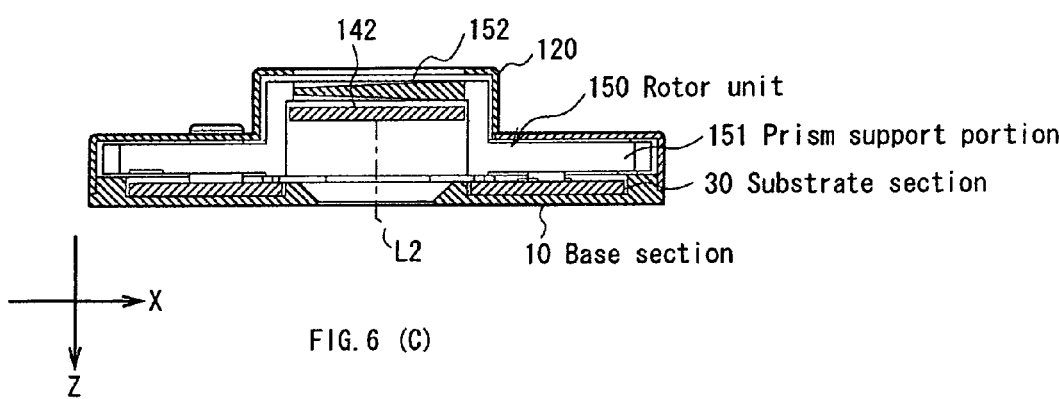
FIG. 6 (A)
FIG. 6 (B)
FIG. 6 (C)

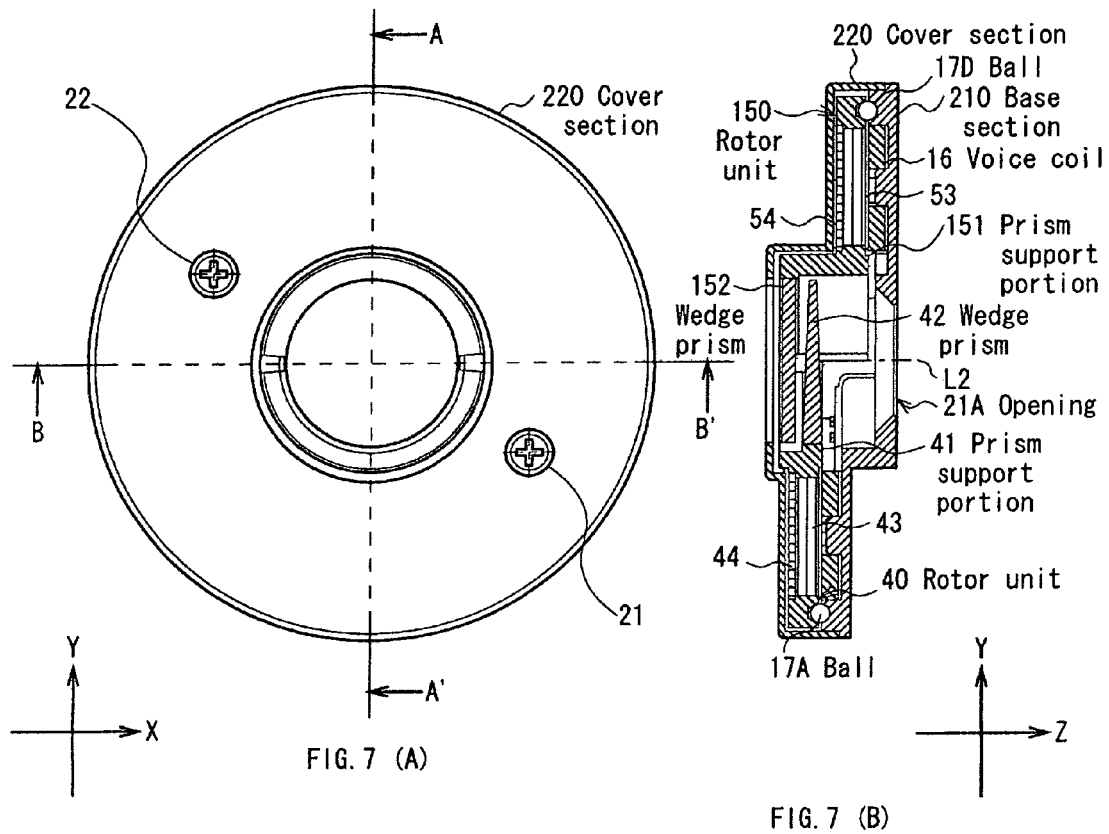
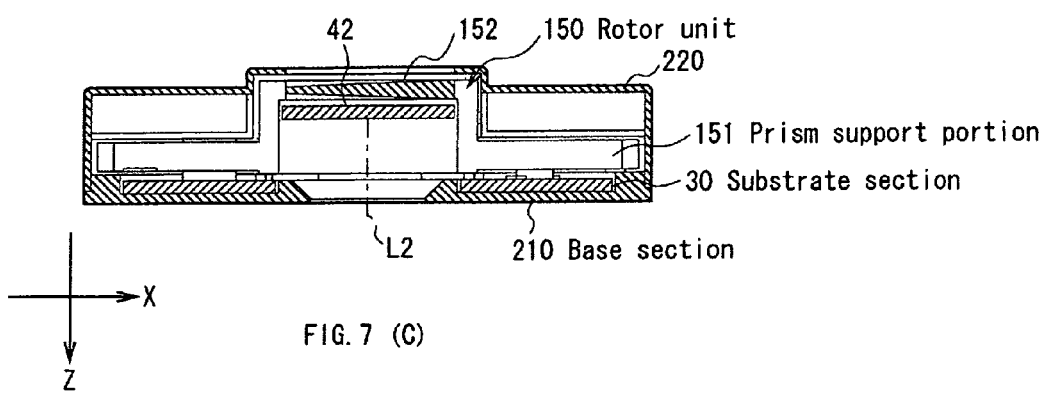
FIG. 7 (A)
FIG. 7 (B)
FIG. 7 (C)

IMAGE BLUR CORRECTION UNIT, IMAGE BLUR COMPENSATION DEVICE, AND OPTICAL APPARATUS

TECHNICAL FIELD

The present invention relates to an image blur compensation unit, an image blur compensation device, and an optical device, and, for example, is preferably applied to a case where camera shake, such as those of digital cameras, is compensated for.

BACKGROUND ART

Currently, a common camera shake compensation function of cameras is of an optical type that physically adjusts an optical axis. Among the optical-type camera shake compensation functions are those of a lens-shift type and an imaging element-shift type.

The lens-shift type camera shake compensation function is designed to move, with respect to an imaging element, part of a group of lenses where a subject image is formed, or all the lenses, in a direction that offsets camera shake by using a dedicated drive mechanism to correct an optical axis, thereby guiding the subject image to the imaging element (See Patent Document 1, for example).

However, in the case of the lens-shift type camera shake compensation function, for a group of lenses that is formed for each camera, the shape of a compensation lens or a drive mechanism that satisfies optical specifications need to be designed each time.

Meanwhile, the imaging element-shift type camera shake compensation function is designed to use a dedicated drive mechanism to move an imaging element in accordance with camera shake, thereby keeping the imaging element at a certain position relative to an optical axis of a group of lens (See Patent Document 2, for example).

However, even in the case of the imaging element-shift type camera shake compensation function, a dedicated drive mechanism needs to be designed each time to be suitable for an imaging element that is different for each camera.

Accordingly, what is proposed is one in which a compensation attachment is attached onto an optical axis of an optical lens (See Patent Document 3, for example): the compensation attachment has a power transmission mechanism including a movable prism, which refracts light entering an optical lens, a motor, which drives the movable prism, and a shaft, which transmits power of the motor to the movable prism.

As a result, there is no need to design the shape of a compensation lens and a drive mechanism for each camera, resulting in simplified design.

PRIOR ART DOCUMENTS

Patent Documents

Patent Document 1: Japanese Patent Application Laid-Open Publication No. H7-20547
Patent Document 2: Japanese Patent Application Laid-Open Publication No. 2006-349707
Patent Document 3: Japanese Patent Application Laid-Open Publication No. 2007-316428

DISCLOSURE OF THE INVENTION

Problems to be Solved by the Invention

However, in the case of the conventional camera shake compensation mechanisms, if a plurality of refractive elements are arranged along an optical axis, each refractive element is supported in a circumferential direction. Therefore, the problem is that the mechanisms become large in size.

The present invention has been made in view of the above points, and is intended to propose an image blur compensation unit, image blur compensation device, and optical device that can be made smaller in size.

To solve the above problem, according to the present invention, an image blur compensation unit includes: a first and a second refractive element that are disposed along an optical axis of light that is guided to an imaging element after passing through an optical lens, and which rotate with respect to a central axis that goes along the optical axis to refract the light to correct a blur of an image that is guided to the imaging element; a first support portion that is provided in one region of 180 degrees or less out of two divided regions with respect to the central axis on a plane perpendicular to the central axis, and which supports the first refractive element on an outer periphery side; a second support portion that is provided in the other region of 180 degrees or less out of the two divided regions, and which supports the second refractive element on an outer periphery side; a base section that supports the first and second support portions at three or more points on a plane perpendicular to the central axis in such a way that the first and second support portions can rotate around the central axis; and a first and a second drive mechanism that are respectively placed in regions where the first and second support portions are provided, and which drive the first and second support portions in such a way that the first and second support portions rotate around the central axis only within the regions to rotate the first and second refractive elements, wherein the first and second drive mechanisms include a first and a second magnet that are placed on one of the base section or first and second support portions, a first and a second coil that are placed on the other one of the base section or first and second support portions so as to face the first and second magnets, and use an electromagnetic force that is generated between the first and second magnets and the first and second coils as current is applied to rotate the first and second support portions, and a first and a second yoke that are placed on the other one of the base section or first and second support portions so as to face the first and second magnets, and use a magnetic force that is generated between the first and second magnets and the first and second yokes to push the first and second support portions against the base section, the center of the first magnet is located inside a polygon connecting points where the first support portion is supported, and the center of the second magnet is located inside a polygon connecting points where the second support portion is supported.

Moreover, according to the present invention, an image blur compensation device that detects and compensates for camera shake includes: a shake detection unit that detects shake of the camera; a first and a second refractive element that are disposed along an optical axis of light that is guided to an imaging element after passing through an optical lens provided in the camera, and which rotate with respect to a central axis that goes along the optical axis to refract the light to correct a blur of an image that is guided to the imaging element; a first support portion that is provided in one region of 180 degrees or less out of two divided regions with respect to the central axis on a plane perpendicular to the central axis, and which supports the first refractive element on an outer periphery side; a second support portion that is provided in the other region of 180 degrees or less out of the two divided regions, and which supports the second refractive element on an outer periphery side; a base section that supports the first and second support portions at three or more points on a plane perpendicular to the central axis in such a way that the first and second support portions can rotate around the central axis; and a first and a second drive mechanism that are respectively placed in regions where the first and second support portions are provided, and which drive the first and second support portions in such a way that the first and second support portions rotate around the central axis only within the regions to rotate the first and second refractive elements, wherein the first and second drive mechanisms include a first and a second magnet that are placed on one of the base section or first and second support portions, a first and a second coil that are placed on the other one of the base section or first and second support portions so as to face the first and second magnets, and use an electromagnetic force that is generated between the first and second magnets and the first and second coils as current is applied to rotate the first and second support portions, and a first and a second yoke that are placed on the other one of the base section or first and second support portions so as to face the first and second magnets, and use a magnetic force that is generated between the first and second magnets and the first and second yokes to push the first and second support portions against the base section, the center of the first magnet is located inside a polygon connecting points where the first support portion is supported, and the center of the second magnet is located inside a polygon connecting points where the second support portion is supported.

According to the present invention, an optical device includes: a first and a second refractive element that are disposed along an optical axis of light, and which rotate with respect to a central axis that goes along the optical axis to refract the light; a first support portion that is provided in one region of 180 degrees or less out of two divided regions with respect to the central axis on a plane perpendicular to the central axis, and which supports the first refractive element on an outer periphery side; a second support portion that is provided in the other region of 180 degrees or less out of the two divided regions, and which supports the second refractive element on an outer periphery side; a base section that supports the first and second support portions at three or more points on a plane perpendicular to the central axis in such a way that the first and second support portions can rotate around the central axis; and a first and a second drive mechanism that are respectively placed in regions where the first and second support portions are provided, and which drive the first and second support portions in such a way that the first and second support portions rotate around the central axis only within the regions to rotate the first and second refractive elements, wherein the first and second drive mechanisms include a first and a second magnet that are placed on one of the base section or first and second support portions, a first and a second coil that are placed on the other one of the base section or first and second support portions so as to face the first and second magnets, and use an electromagnetic force that is generated between the first and second magnets and the first and second coils as current is applied to rotate the first and second support portions, and a first and a second yoke that are placed on the other one of the base section or first and second support portions so as to face the first and second magnets, and use a magnetic force that is generated between the first and second magnets and the first and second yokes to push the first and second support portions against the base section, the center of the first magnet is located inside a polygon connecting points where the first support portion is supported, and the center of the second magnet is located inside a polygon connecting points where the second support portion is supported.

Therefore, the first and second support portions, which are provided on the outer periphery sides of the first and second refractive elements and respectively rotate in the two divided regions of 180 degrees or less, are pushed against the base section and kept by a magnetic force generated between the yokes and the magnets that are located in the polygons connecting the points where the first and second support portions are supported. Accordingly, the first and second support portions do not enter the other regions, there is no need to provide separately, and the first and second support portions can be kept at the base section.

As described above, according to the present invention, the first and second support portions, which are provided on the outer periphery sides of the first and second refractive elements and respectively rotate in the two divided regions of 180 degrees or less, are pushed against the base section and kept by a magnetic force generated between the yokes and the magnets that are located in the polygons connecting the points where the first and second support portions are supported. Accordingly, the first and second support portions do not enter the other regions, there is no need to provide separately, and the first and second support portions can be kept at the base section. As a result, the device can be made smaller in size.

BRIEF DESCRIPTION OF THE DRAWINGS

FIG. 6(A) shows the configuration of an image blur compensation mechanism according to another embodiment; FIG. 6(B) is a cross-sectional view of FIG. 6(A) taken along A-A'; FIG. 6(C) is a cross-sectional view of FIG. 6(A) taken along B-B'.

FIG. 7(A) shows the configuration of an image blur compensation mechanism according to another embodiment; FIG. 7(B) is a cross-sectional view of FIG. 7(A) taken along A-A'; FIG. 7(C) is a cross-sectional view of FIG. 7(A) taken along B-B'.

EMBODIMENTS FOR CARRYING OUT THE INVENTION

[1. Configuration of Camera]

Figure 1:
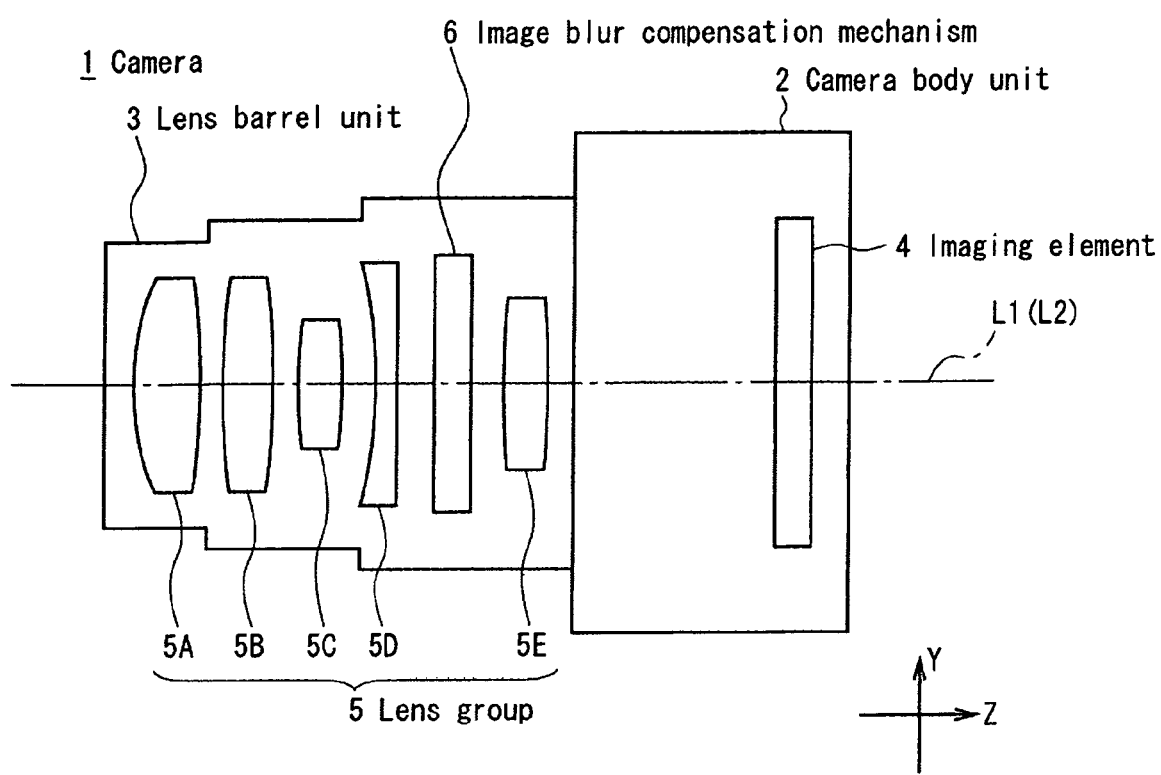
FIG. 1 is a schematic diagram showing the optical configuration of a camera.

FIG. 1 shows a camera 1 according to one embodiment of the present invention. The camera 1 includes a camera body unit 2, and a lens barrel unit 3, which is mounted on the camera body unit 2 so as to be able to be attached thereto and detached therefrom. In the camera body unit 2, an imaging element 4 on which a subject image is formed, such as CCD (Charge Coupled Device Image Sensor) or CMOS (Complementary Metal Oxide Semiconductor), is provided.

In the lens barrel unit 3, the following components are provided: a lens group 5, which includes a plurality of lenses 5A to 5E; and an image blur compensation mechanism 6, which is designed to move a subject image in a horizontal direction (X-axis direction) and a vertical direction (Y-axis direction) with respect to an optical axis L1 of the lens group 5. The image blur compensation mechanism 6 is for example disposed in a space between the lenses 5D and 5E where a light beam passing through the lens group 5 becomes narrow on the optical axis L1.

The lens group 5 is moved in the direction of the optical axis L1 to adjust zooming and focus. The imaging element 4 converts a subject image, which is formed after passing through the lens group 5 and the image blur compensation mechanism 6, into electrical signals. In the camera 1, A/D conversion is carried out on the electrical signals to obtain image data.

According to the present embodiment, a direction that goes along the optical axis L1 of the lens group 5 is referred to as Z-axis direction; a horizontal direction that is perpendicular to the Z-axis direction as X-axis direction; and a vertical direction that is perpendicular to the Z-axis direction as Y-axis direction.

[2. Image Blur Compensation Mechanism]

Figure 2:
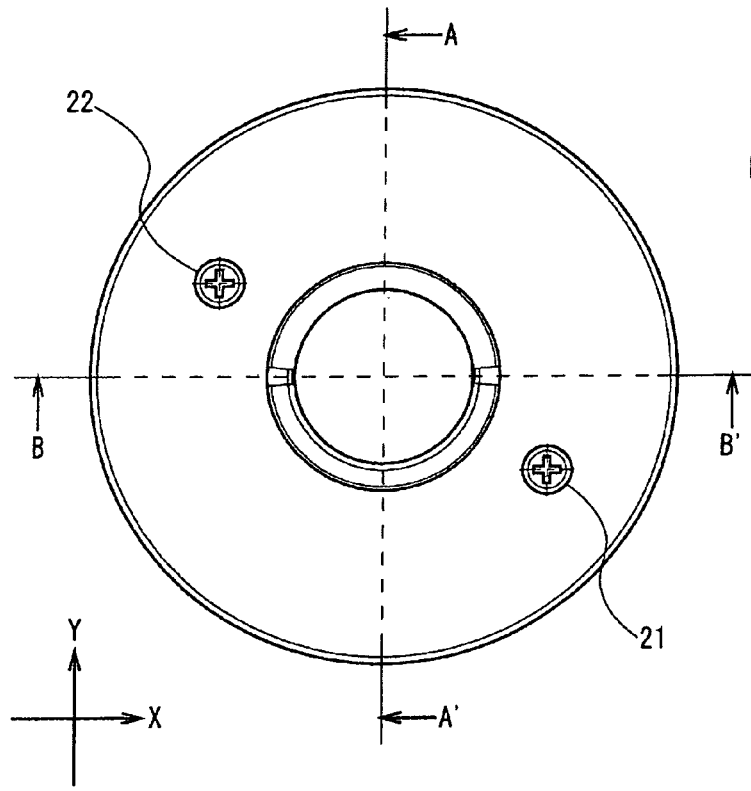
FIG. 2(A) shows the configuration of an image blur compensation mechanism.
FIG. 2(B) is a cross-sectional view of FIG. 2(A) taken along A-A'.
FIG. 2(C) is a cross-sectional view of FIG. 2(A) taken along B-B'.
Figure 2:
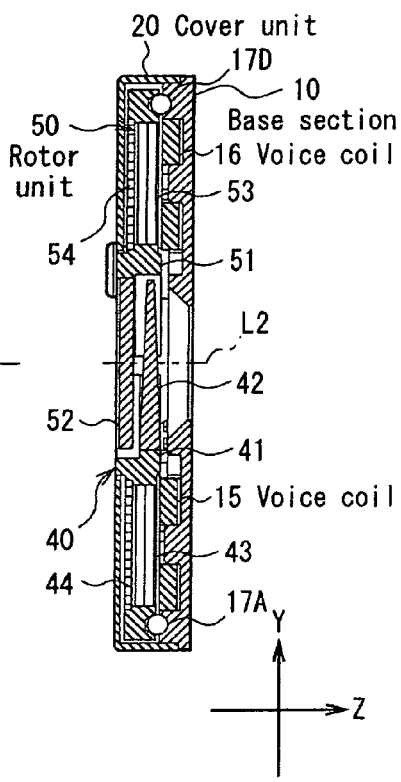
Figure 2:
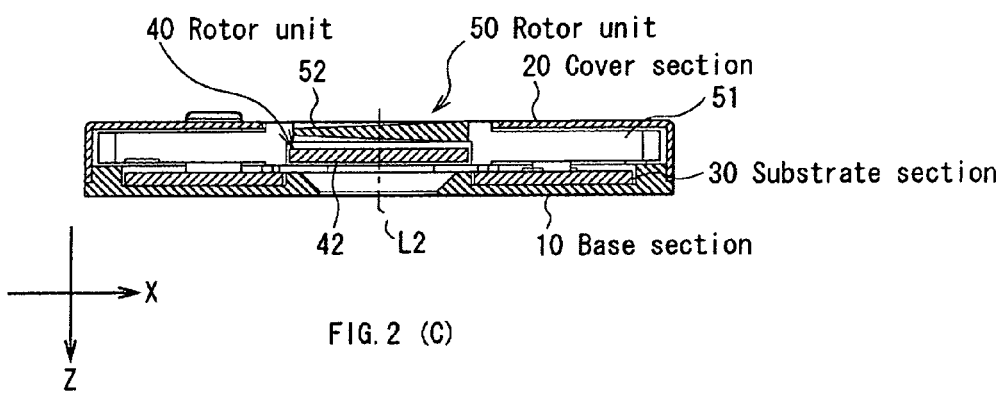
Figure 3:
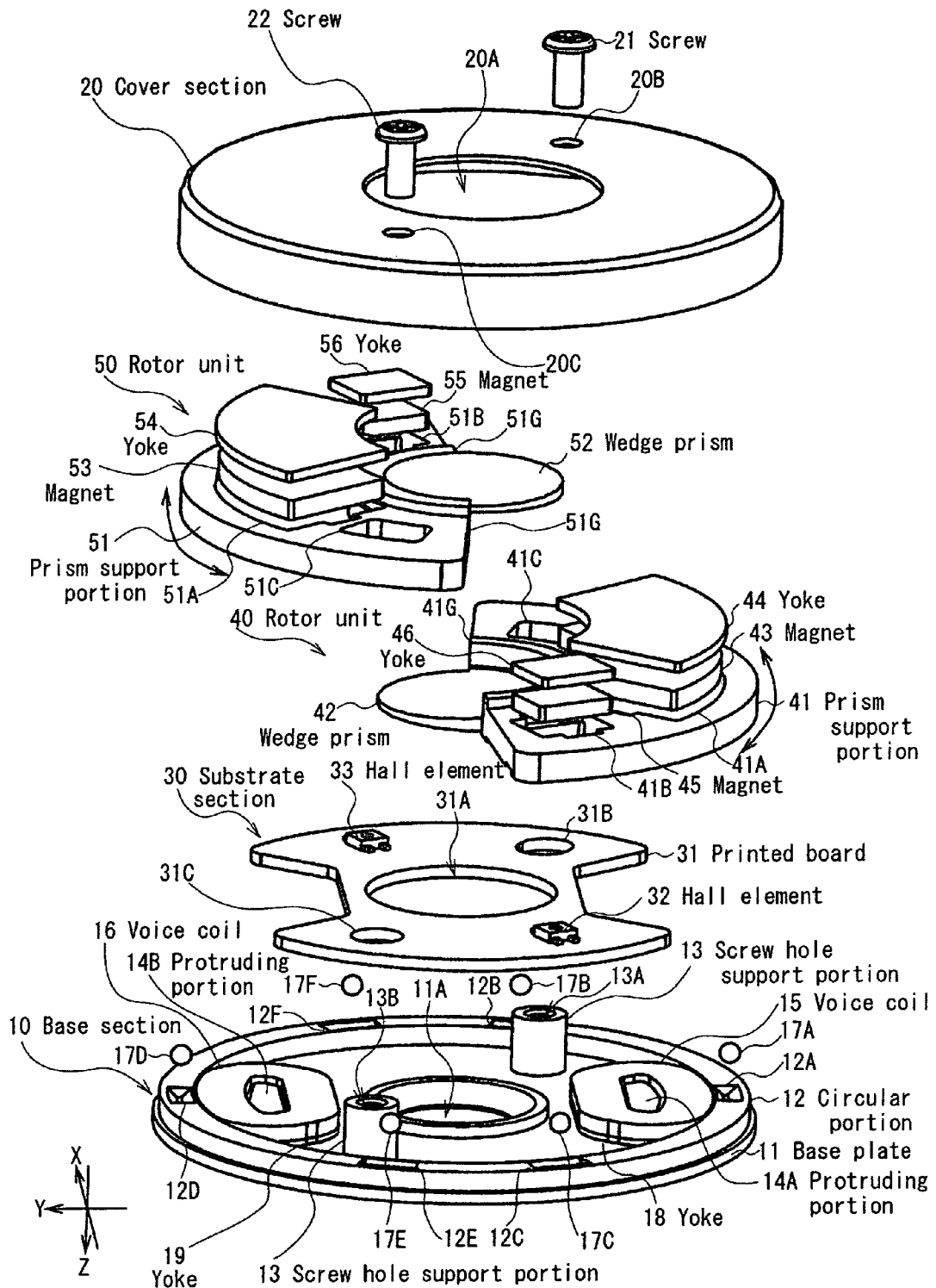
FIG. 3 is an exploded perspective view of an image blur compensation mechanism.
Figure 4:
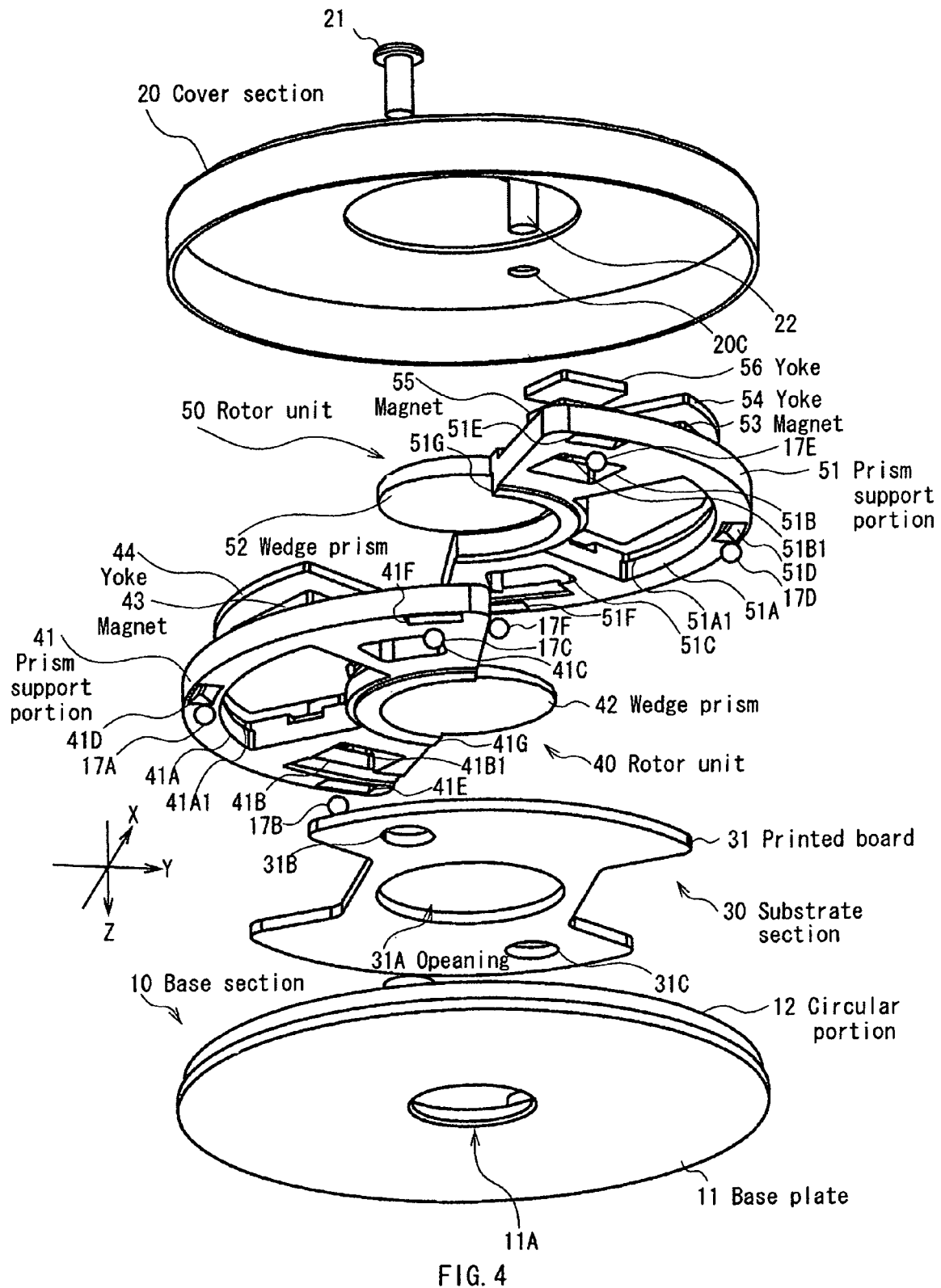
FIG. 4 is an exploded perspective view of an image blur compensation mechanism.

As shown in FIGS. 2 to 4, the image blur compensation mechanism 6 is formed substantially into a flat cylindrical shape, for example, with a diameter of 30 mm and a thickness of 5 mm. The image blur compensation mechanism 6 is disposed in the lens barrel unit 3 in such a way that a central axis L2 thereof is aligned with the optical axis L1 of the lens group 5. Incidentally, the central axis L2 is the center of rotation of wedge prisms 42 and 52, which will be described later, and is not necessarily aligned with the optical axis L1.

In the image blur compensation mechanism 6, a base section 10, which is made of resin or the like and is substantially formed into a circular flat plate, is covered with a cup-shaped cover section 20, which is made of resin or the like, to create a space where a substrate section 30 and rotor units 40 and 50 are disposed.

In the base section 10, a base plate 11, a circular portion 12, screw hole support portions 13, and protruding portions 14 are made of resin or the like, and are formed integrally.

The base plate 11 is substantially in the shape of a circular flat plate, and is provided with an opening 11A, whose center is the central axis L2 and which is larger than the light beam of a subject image passing through the lens group 5.

The circular portion 12 extends from an outer edge on a cover section 20's side surface of the base plate 11 to an inner side by an amount equivalent to the thickness of the cover section 20; is slightly longer in width than the width of ball grooves 12A to 12F in which balls 17A to 17F, which will be detailed later, roll; and is formed into a ring shape that is higher than the thickness of a printed board 31.

The screw hole support portions 13 each are formed into a cylindrical shape, with screw grooves 13A and 13B provided inside. The screw hole support portions 13 are provided at predetermined positions inside the circular portion 12 on the cover section 20's side surface of the base plate 11 so as to be symmetrical with respect to the central axis L2.

On the base plate 11, inside the circular portion 12 on the cover section 20's side surface, voice coils 15 and 16, which are thinner than the height of the circular portion 12, and yokes 18 and 19 are provided. The centers of the voice coils 15 and 16 each are located on a vertical line (Y-axis) that is perpendicular to the central axis L2. The voice coils 15 and 16 are so disposed as to be symmetrical with respect to the central axis L2. The voice coils 15 and 16 are formed substantially into a fan shape, with electric wires wound around so as to be substantially parallel to a surface of the base plate 11. The yokes 18 and 19 are formed substantially into the same shape as the voice coils 15 and 16.

On the base plate 11, inside the circular portion 12 on the cover section 20's side surface, protruding portions 14A and 14B are provided: the protruding portions 14A and 14B are smaller in height than the height of the yokes 18 and 19 and voice coils 15 and 16 put together, and the outer peripheral shape thereof is substantially the same as the inner peripheral shape of the voice coils 15 and 16 and yokes 18 and 19. The protruding portions 14A and 14B are so placed as to be symmetrical with respect to the central axis L2.

As for the ball grooves 12A to 12F formed on the circular portion 12, the ball grooves 12A and 12D are so provided as to be symmetrical with respect to the center of the base plate 11, and the ball grooves 12B and 12E, and the ball grooves 12C and 12F, too, are so provided as to be symmetrical with respect to the center of the base plate 11.

The ball grooves 12A and 12D are provided on a central line (Y-axis) that passes through the centers of the voice coils 15 and 16. The ball grooves 12B and 12C are provided at line-symmetry positions that are closer to the ball groove 12A (Y-axis negative direction side) than the central axis L2 on the circular portion 12 with respect to the Y-axis in such a way that the center of the voice coil 15 is placed inside a triangle connecting the centers of the ball grooves 12A, 12B, and 12C. Similarly, the ball grooves 12E and 12F are provided at line-symmetry positions that are closer to the ball groove 12D (Y-axis positive direction side) than the central axis L2 on the circular portion 12 with respect to the Y-axis in such a way that the winding center of the voice coil 16 is placed inside a triangle connecting the centers of the ball grooves 12D, 12E, and 12F.

On the cover section 20, a circular opening 20A that is larger than the light beam of a subject image that passes through the lens group 5 is provided in such a way that the center thereof is on the central axis L2. In the cover section 20, holes 20B and 20C, into which screws 21 and 22 are inserted, are provided at positions that face the screw hole support portions 13 of the base section 10.

The substrate section 30 includes a printed board 31 and hall elements 32 and 33. The printed board 31 is formed substantially into a flat circular shape whose diameter is almost equal to the inner diameter of the circular portion 12, with the portions corresponding to the voice coils 15 and 16 removed, in such a way that the printed board 31 is in close contact with the inner part of the circular portion 12 on the base plate 11.

On the printed board 31, an opening 31A that is slightly larger than the opening 11A is provided at a position corresponding to the opening 11A of the base plate 11. On the printed board 31, holes 31B and 31C are provided: Into the holes 31B and 31C, the two screw hole support portions 13 of the base section 10 are respectively inserted.

The hall elements 32 and 33 are provided adjacent to the voice coils 15 and 16 so as to be symmetrical with respect to the central axis L2.

The rotor unit 40 includes a prism support portion 41, wedge prism 42, magnet 43, yoke 44, magnet 45, and yoke 46, which are integrally formed with a transparent acrylic resin, for example.

The prism support portion 41 is formed into a flat fan plane shape which is provided around the central axis L2 with the central angle thereof less than 180 degrees, and whose outer periphery radius is equal to the outer periphery radius of the circular portion 12 of the base section 10, and whose portion corresponding to the wedge prism 42 is cut (or dented) around the central axis L2.

In the prism support portion 41, a hole 41A is provided on a center line bisecting the central angle and at a position facing the voice coil 15 so as to be in the shape of an outer periphery shape of the magnet 43 and yoke 44, thereby allowing the magnet 43 and the yoke 44 to fit therein.

The plane-direction outer shape of the magnet 43 is slightly smaller than that of the yoke 44. Therefore, since the hole 41A is formed in the outer periphery shape of the magnet 43 and yoke 44, a step 41A1 is so formed as to make the hole smaller along the Z-axis direction.

In the prism support portion 41, a hole 41B is provided in an outer periphery shape of the magnet 45 and yoke 46, thereby allowing the magnet 45 and the yoke 46 to fit therein at a position facing the hall element 32.

The plane-direction outer shape of the magnet 45 is slightly smaller than that of the yoke 46. Therefore, since the hole 41B is formed in the outer periphery shape of the magnet 45 and yoke 46, a step 41B1 is so formed as to make the hole smaller along the Z-axis direction.

In the prism support portion 41, a hole 41C is provided at a position facing a screw hole support portion 13 in which a screw groove 13A is provided. The hole 41C is formed large enough that, when the prism support portion 41 rotates around the central axis L2, the screw hole support portion 13 in which the screw groove 13A is provided comes in contact with the prism support portion 41, thereby keeping the rotor units 40 and 50 from coming in contact with both ends of the prism support portions 41 and 51 even as the rotor units 40 and 50 rotate in a direction in which the rotor units 40 and 50 approaches both ends of the prism support portions 41 and 51.

On the prism support portion 41, ball grooves 41D, 41E, and 41F are provided at positions facing the ball grooves 12A, 12B, and 12C of the base section 10 on a surface facing the base section 10: the cross sections of the ball grooves 41D, 41E, and 41F are substantially in a triangular shape. That is, the prism support portion 41 rotates and moves in a range of 180 degrees or less around the central axis L2 on the plane.

The wedge prism 42 is molded integrally with the prism support portion 41 in such a way that the wedge prism 42 is thinner than half the thickness of a thick portion 41G, which is part of the prism support portion 41 that is designed to be thick and support the wedge prism 42, and that the entire wedge prism 42 is placed closer to the base section 10 (Z-axis positive direction side) than the center of the thickness direction of the thick portion 41G.

The wedge prism 42 is formed substantially into a circular flat plate shape whose center is the central axis L2. Both surfaces of the wedge prism 42 are tilted in such a way as to come closer to each other toward the Y-axis positive direction with respect to an XY plane (or a plane perpendicular to the central axis L2). That is, both surfaces of the wedge prism 42 are tilted with respect to the XY plane in such a way as to be thick on the side of the prism support portion 41 (Y-axis negative direction side), and thin on the opposite side (Y-axis positive direction side).

The rotor unit 50 include a prism support portion 51, wedge prism 52, magnet 53, yoke 54, magnet 55, and yoke 56, which are integrally formed with a transparent acrylic resin, for example.

The prism support portion 51 is formed into a flat fan plane shape which is provided around the central axis L2 with the central angle thereof less than 180 degrees, and whose outer periphery radius is equal to the outer periphery radius of the circular portion 12 of the base section 10, and whose portion corresponding to the wedge prism 52 is cut (or dented) around the central axis L2.

In the prism support portion 51, a hole 51A is provided on a center line bisecting the central angle and at a position facing the voice coil 16 so as to be in an outer periphery shape of the magnet 53 and yoke 54, thereby allowing the magnet 53 and the yoke 54 to fit therein.

The plane-direction outer shape of the magnet 53 is slightly smaller than that of the yoke 54. Therefore, since the hole 51A is formed in the outer periphery shape of the magnet 53 and yoke 54, a step 51A1 is so formed as to make the hole smaller along the Z-axis direction.

In the prism support portion 51, a hole 51B is provided in an outer periphery shape of the magnet 55 and yoke 56, thereby allowing the magnet 55 and the yoke 56 to fit therein at a position facing the hall element 33.

The plane-direction outer shape of the magnet 53 is slightly smaller than that of the yoke 54. Therefore, since the hole 51B is formed in the outer periphery shape of the magnet 55 and yoke 56, a step 51B1 is so formed as to make the hole smaller along the Z-axis direction.

In the prism support portion 51, a hole 51C is provided at a position facing a screw hole support portion 13 in which a screw groove 13B is provided. The hole 51C is formed large enough that, when the prism support portion 51 rotates around the central axis L2, the screw hole support portion 13 in which the screw groove 13B is provided comes in contact with the prism support portion 51, thereby keeping the rotor units 40 and 50 from coming in contact with both ends of the prism support portions 41 and 51 even as the rotor units 40 and 50 rotate in a direction in which the rotor units 40 and 50 approaches both ends of the prism support portions 41 and 51.

On the prism support portion 51, ball grooves 51D, 51E, and 51F are provided at positions facing the ball grooves 12D, 12E, and 12F of the base section 10 on a surface facing the base section 10: the cross sections of the ball grooves 51D, 51E, and 51F are substantially in a triangular shape.

The wedge prism 52 is molded integrally with the prism support portion 51 in such a way that the wedge prism 52 is thinner than half the thickness of a thick portion 51G, which is part of the prism support portion 51 that is designed to be thick and support the wedge prism 52, and that the entire wedge prism 52 is placed closer to the cover section 20 (Z-axis negative direction side) than the center of the thickness direction of the thick portion 51G. Incidentally, the thick portion 51G is so formed as to have the same Z-axis direction thickness as the thick portion 41G. The thick portions 41G and 51G may be equal in thickness to other portions as long as the wedge prisms 42 and 52 can be supported within the Z-axis direction thickness of the prism support portions 41 and 51.

The wedge prism 52 is formed substantially into a circular flat plate shape whose center is the central axis L2. Both surfaces of the wedge prism 52 are tilted in such a way as to come closer to each other toward the X-axis negative direction with respect to an XY plane (or a plane perpendicular to the central axis L2). That is, both surfaces of the wedge prism 52 are tilted with respect to the XY plane in such a way as to be thick on the X-axis positive direction side, and thin on the opposite side (X-axis negative direction side).

When the image blur compensation mechanism 6 that includes the above-described components is assembled, the substrate section 30 is fitted into the inner side of the circular portion 12 of the base plate 11 of the base section 10 before being bonded together, for example; the voice coils 15 and 16 and the yokes 18 and 19 are fitted into the outer side of the protruding portions 14 of the base plate 11 before being bonded together, for example.

As for the rotor unit 40, the magnet 43 and the yoke 44 are disposed in the hole 41A of the prism support portion 41, and the magnet 45 and the yoke 46 in the hole 41B of the prism support portion 41.

The rotor unit 40 is supported by the base section 10 with a predetermined gap therebetween in such a way that balls 17A to 17C are held between the ball grooves 41D to 41F of the prism support portion 41, and the ball grooves 12A to 12C of the base section 10. As for the rotor unit 40, a position where a center line bisecting the central angle of the prism support portion 41 is aligned with the vertical direction (Y-axis) that is perpendicular to the central axis L2 is set as a reference position.

At this time, in the rotor unit 40, the ball grooves 41D to 41F only come in contact with the balls 17A to 17C, and the rotor unit 40 is three-point supported by the balls 17A to 17C. Therefore, the rotor unit 40 can rotate around the central axis L2 only at a predetermined angle in a left-right direction with respect to the Y-axis.

As the rotor unit 40 is rotated, the wedge prism 42 refracts the light that enters after passing through the lens group 5 in accordance with the angle of the rotation, and is moved substantially along the Y-axis.

The sizes of the ball grooves 12A to 12C and ball grooves 41D to 41F are so determined that, when the prism support portion 41 is rotated to the leftmost or rightmost and when the screw hole support portion 13 in which the screw groove 13A is provided comes in contact with the hole 41 C of the prism support portion 41, the balls 17A to 17C do not come in contact with both ends of the ball grooves.

The rotor unit 40 is continuously attracted in a direction of the base section 10 (Z-axis positive direction) by an attractive force of the yoke 18 that attracts the magnet 43. As a result, the rotor unit 40 is not separated from the base section 10, and is supported by the base section 10.

At this time, in the prism support portion 41, the magnet 43 is in close contact with the yoke 44 because of a magnetic force. An outer periphery portion of the yoke 44 hangs on the step 41A1, thereby keeping the magnet 43 and the yoke 44 from coming off from the prism support portion 41.

Similarly, in the prism support portion 41, the magnet 45 is in close contact with the yoke 46 because of a magnetic force. An outer periphery portion of the yoke 46 hangs on the step 41B1, thereby preventing the magnet 45 and the yoke 46 from coming off from the prism support portion 41 and keeping the magnet 45 and the yoke 46 at a position facing the hall element 32.

As for the rotor unit 50, the magnet 53 and the yoke 54 are disposed in the hole 51A of the prism support portion 51, and the magnet 55 and the yoke 56 in the hole 51B of the prism support portion 51.

The rotor unit 50 is supported by the base section 10 with a predetermined gap therebetween in such a way that balls 17D to 17F are held between the ball grooves 51D to 51F of the prism support portion 51, and the ball grooves 12D to 12F of the base section 10. As for the rotor unit 50, a position where a center line bisecting the central angle of the prism support portion 51 is aligned with the vertical direction (Y-axis) that is perpendicular to the central axis L2 is set as a reference position.

At this time, in the rotor unit 50, the ball grooves 51D to 51F only come in contact with the balls 17D to 17F, and the rotor unit 50 is three-point supported by the balls 17D to 17F. Therefore, the rotor unit 50 can rotate around the central axis L2 only at a predetermined angle in a left-right direction with respect to the Y-axis. Accordingly, the prism support portions 41 and 51 each are supported by the base section 10 and are rotated on the same XY plane that is perpendicular to the central axis L2.

As the rotor unit 50 is rotated, the wedge prism 52 refracts the light that enters after passing through the lens group 5 in accordance with the angle of the rotation, and is moved substantially along the X-axis.

The sizes of the ball grooves 12D to 12F and ball grooves 51D to 51F are so determined that, when the prism support portion 51 is rotated to the leftmost or rightmost and when the screw hole support portion 13 in which the screw groove 13B is provided comes in contact with the hole 51C of the prism support portion 51, the balls 17D to 17F do not come in contact with both ends of the ball grooves.

The rotor unit 50 is continuously attracted in a direction of the base section 10 (Z-axis positive direction) by an attractive force of the yoke 19 that attracts the magnet 53. As a result, the rotor unit 50 is not separated from the base section 10, and is supported by the base section 10.

At this time, in the prism support portion 51, the magnet 53 is in close contact with the yoke 54 because of a magnetic force. An outer periphery portion of the yoke 54 hangs on the step 51A1, thereby keeping the magnet 53 and the yoke 54 from coming off from the prism support portion 51.

Similarly, in the prism support portion 51, the magnet 55 is in close contact with the yoke 56 because of a magnetic force. An outer periphery portion of the yoke 56 hangs on the step 51B1, thereby preventing the magnet 55 and, the yoke 56 from coming off from the prism support portion 51 and keeping the magnet 55 and the yoke 56 at a position facing the hall element 33.

After the substrate section 30 and the rotor units 40 and 50 are disposed on the base section 10, the cover section 20 is fixed in such a way as to cover the above components as screws 21 and 22 are screwed into the screw grooves 13A and 13B of the screw hole support portions 13.

As described above, the wedge prism 42 is molded in such a way that the wedge prism 42 is thinner than half the thickness of the thick portion 41G and that the entire wedge prism 42 is placed closer to the Z-axis positive direction side than the center of the thickness direction of the thick portion 41G. The wedge prism 52 is molded in such a way that the wedge prism 52 is thinner than half the thickness of the thick portion 51G and that the entire wedge prism 52 is placed closer to the Z-axis negative direction side than the center of the thickness direction of the thick portion 51G.

Therefore, when the rotor units 40 and 50 are supported with respect to the base section 10, the wedge prisms 42 and 52 are so supported as to face a space that is formed as the prism support portions 41 and 51 are placed adjacent to each other; the wedge prisms 42 and 52 can rotate around the central axis L2 (optical axis L1) without coming in contact with each other.

[3. Circuit Configuration of Camera]

Figure 5:
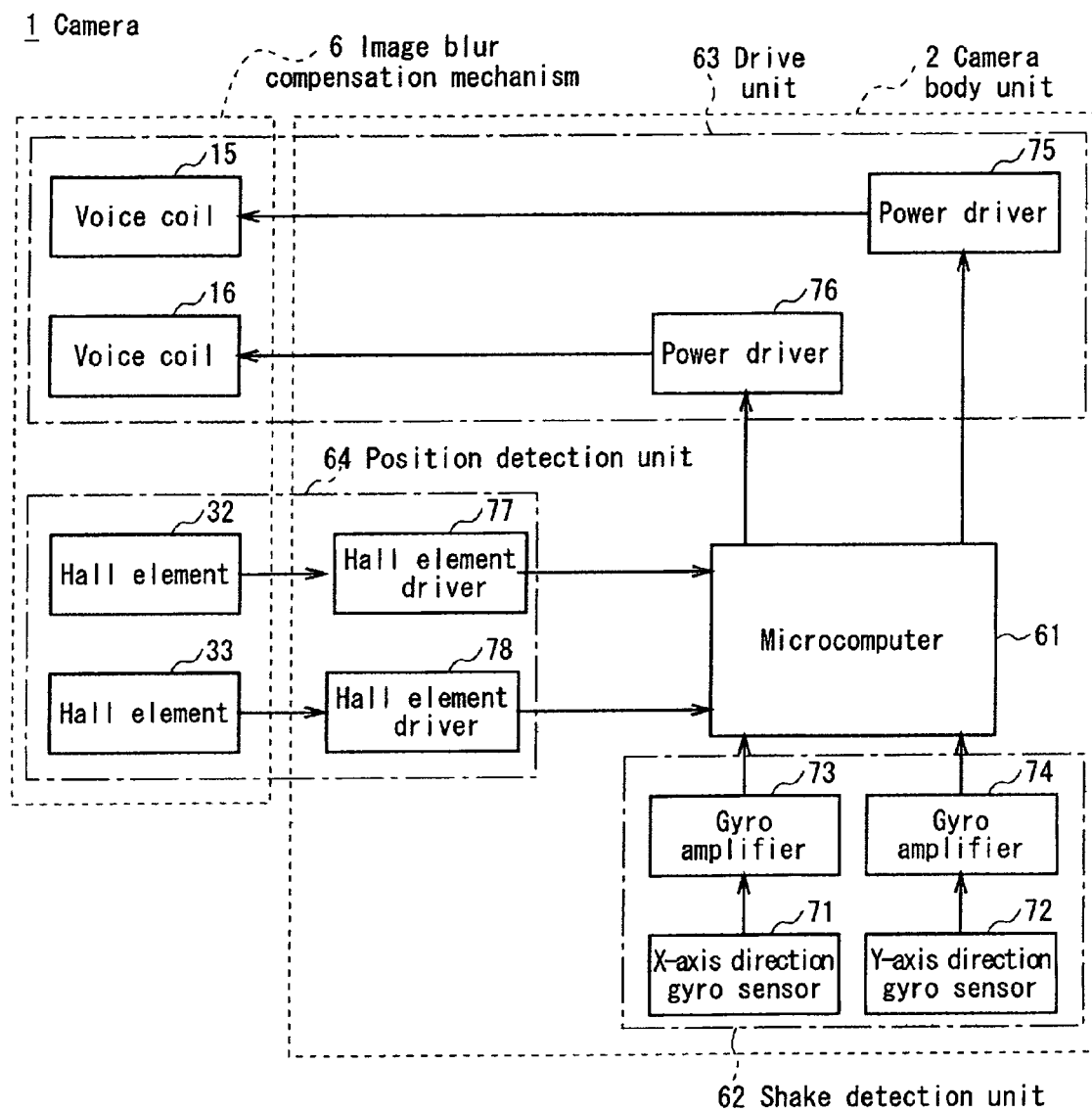
FIG. 5 is a schematic diagram showing the circuit configuration of a camera.

The following describes the circuit configuration of the camera 1 with the use of FIG. 5. Incidentally, for ease of explanation, in FIG. 5, only circuits that are used to control image blur are shown; the other portions are omitted.

The camera 1 includes a microcomputer 61, which takes overall control; a shake detection unit 62, which detects the shake of the camera 1; a drive unit 63, which rotates and drives the rotor units 40 and 50; and a position detection unit 64, which detects the positions of the rotor units 40 and 50.

More specifically, in the camera body unit 2, the microcomputer 61, an X-axis direction gyro sensor 71, a Y-axis direction gyro sensor 72, gyro amplifiers 73 and 74, power drivers 75 and 76, and hall element drivers 77 and 78 are provided.

In the image blur compensation mechanism 6, the voice coils 15 and 16 and the hall elements 32 and 33 are provided.

The microcomputer 61 takes the form of a computer, including CPU (Central Processing Unit), ROM (Read Only Memory), and RAM (Random Access memory). The microcomputer 61 loads a basic program, which is stored in the ROM, into the RAM to execute, thereby taking overall control. The microcomputer 61 also loads various programs, which are stored in the ROM, into the RAM to execute, thereby carrying out various processes.

The X-axis direction gyro sensor 71 detects an X-axis direction angular velocity of the camera 1, i.e. the X-axis direction shake, as an angular velocity signal. The Y-axis direction gyro sensor 72 detects a Y-axis direction angular velocity of the camera 1, i.e. the Y-axis direction shake, as an angular velocity signal.

The gyro amplifiers 73 and 74 amplify the angular velocity signals detected by the X-axis direction gyro sensor 71 and the Y-axis direction gyro sensor 72 before transmitting to the microcomputer 61.

The power drivers 75 and 76 applies current to the voice coils 15 and 16 under the control of the microcomputer 61.

The hall elements 32 and 33 are so disposed as to face the magnets 45 and 55, which are disposed on the prism support portions 41 and 51, respectively. The hall elements 32 and 33 detect, as a magnetic field signal, a change in the magnetic fields that are generated by the magnets 45 and 55 and are changed by the rotational movements of the rotor units 40 and 50.

The hall element drivers 77 and 78 amplify the magnetic field signals detected by the hall elements 32 and 33 before transmitting to the microcomputer 61.

The microcomputer 61 calculates the amounts of X-axis and Y-axis direction shakes of the camera 1 on the basis of the angular velocity signals that are detected by the X-axis direction gyro sensor 71 and Y-axis direction gyro sensor 72 and are supplied via the gyro amplifiers 73 and 74.

Then, the microcomputer 61 calculates the amounts of movement by which an image to be formed on the imaging element 4 is moved in the X-axis and Y-axis directions in order to correct the amounts of X-axis and Y-axis direction shakes of the camera 1 calculated.

The microcomputer 61 calculates an angle by which the rotor units 40 and 50 are rotated in order to move the image by the calculated amounts of movement. The microcomputer 61 controls the power drivers 75 and 76 to allow the rotor units 40 and 50 to rotate by the angle, and applies current to the voice coils 15 and 16.

More specifically, after detecting the amounts of X-axis and Y-axis direction shakes of the camera 1, the microcomputer 61 rotates and moves the rotor unit 40 in accordance with the amount of Y-axis direction shake, and also rotates and moves the rotor unit 50 in accordance with the amount of X-axis direction shake. In this manner, the microcomputer 61 moves the light passing through the lens group 5 in accordance with the amounts of camera shakes.

The microcomputer 61 acquires, at regular intervals, the magnetic field signals that are detected by the hall elements 32 and 33 and are supplied via the hall element drivers 77 and 78; and calculates the rotation speed and rotation angle of the rotor units 40 and 50 on the basis of the magnetic field signals.

The microcomputer 61 performs a feedback control process until the rotation angles of the rotor units 40 and 50, which are calculated at predetermined intervals, reach an angle by which the rotor units 40 and 50 need to be moved to correct the amounts of camera shakes.

As a result, the camera 1 can compensate for the shake of the camera 1 by controlling the rotation of the rotor units 40 and 50 of the image blur compensation mechanism 6.

[4. Operation and Effects]

According to the above configuration, in the image blur compensation mechanism 6, the wedge prisms 42 and 52, which refract the light that is guided to the imaging element 4 after passing through the lens group 5, are respectively supported by the prism support portions 41 and 51, which are rotatable and are disposed on the same plane that is perpendicular to the central axis L2 (optical axis L1).

At that time, the wedge prisms 42 and 52 are separated along the central axis L2 with a predetermined gap therebetween so as to face a space that is created at a time when the prism support portions 41 and 51 are disposed adjacent to each other. In this manner, the prism support portion 41 supports the wedge prism 42 on the side of one end (Z-axis positive direction side) along the central axis L2; the prism support portion 51 supports the wedge prism 52 on the side of one end (Z-axis negative direction side) along the central axis L2.

Therefore, in the image blur compensation mechanism 6, when the wedge prisms 42 and 52, which need to be disposed along the central axis L2 so as to face each other with a predetermined gap therebetween, are supported, the prism support portions 41 and 51 are disposed on the same plane. As a result, the thickness of the direction of the central axis L2 can be made thinner than when the prism support portions 41 and 51 are disposed along the central axis L2 with a predetermined distance therebetween. Therefore, the image blur compensation mechanism 6 can be made smaller in size.

In the image blur compensation mechanism 6, on a surface of the base section 10 that is perpendicular to the central axis L2 and which supports the prism support portions 41 and 52, the voice coils 15 and 16 and the yokes 18 and 19 are disposed. On the prism support portions 41 and 51, at positions facing the voice coils 15 and 16, the magnets 43 and 53 are disposed.

In the image blur compensation mechanism 6, current is applied to the voice coils 15 and 16, and the prism support portions 41 and 51 are rotated by an electromagnetic force that is generated between the magnets 43 and 53.

Therefore, in the image blur compensation mechanism 6, all that is required is to place a mechanism for rotating the wedge prisms 42 and 52 only on one side of the base section 10. As a result, the image blur compensation mechanism 6 can be made smaller in size accordingly. At this time, in the image blur compensation mechanism 6, an attractive force generated between the yoke 18 and the magnet 43 and between the yoke 19 and the magnet 53 is used to press the prism support portions 41 and 51 against the base section 10. Therefore, there is no need to provide a separate device for keeping the prism support portions 41 and 51 on the base section 10. As a result, the image blur compensation mechanism 6 can be made smaller in size accordingly.

In the image blur compensation mechanism 6, the prism support portions 41 and 51 are three-point supported by the balls 17A to 17C and 17D to 17F, which are disposed on the same plane. The centers of the magnets 43 and 53, which are disposed on the prism support portions 41 and 51, are each located inside a triangle that connects the supporting three points. Therefore, the rotor units 40 and 50 can be supported in a stable manner even if another device is not provided. As a result, the image blur compensation mechanism 6 can be made smaller in size accordingly.

According to the above configuration, the wedge prisms 42 and 52, which refract the light that is guided to the imaging element 4 after passing through the lens group 5, are supported by the prism support portions 41 and 51, which are rotatable and are disposed on the same plane that is perpendicular to the central axis L2. The wedge prisms 42 and 52 are separated along the central axis L2 with a predetermined gap therebetween so as to face a space that is created at a time when the prism support portions 41 and 51 are disposed adjacent to each other. In this manner, the prism support portion 41 supports the wedge prism 42 on the side of one end along the central axis L2; the prism support portion 51 supports the wedge prism 52 on the side of the other end along the central axis L2. The prism support portions 41 and 51, which support the wedge prisms 42 and 52 that need to be disposed along the central axis L2 so as to face each other with a predetermined gap therebetween, are disposed on the same plane. Therefore, the optical axis-direction thickness can be made thinner, and the device can be made smaller in size.

[5. Other Embodiments]

According to the above-described embodiment, what is described is the case where, in the image blur compensation mechanism 6, the cover section 20 is provided. However, the present invention is not limited to that configuration. The cover section 20 may not be provided. Even in this case, the rotor units 40 and 50 attract each other because of a magnetic force generated between the magnet 43 and the yoke 18 and between the magnet 53 and the yoke 19. As a result, the rotor units 40 and 50 are not detached from the base section 10.

According to the above-described embodiment, what is described is the case where the wedge prisms 42 and 52 having a surface tilted with respect to a plane perpendicular to the central axis L2 are used to move, in the X-axis and Y-axis directions, the light that strikes the imaging element 4 after passing through the lens group 5. However, the present invention is not limited to that configuration. For example, a diffraction grating or the like may be used as long as it is possible to move, in the X-axis and Y-axis directions, the light that strikes the imaging element 4 after passing through the lens group 5.

According to the above-described embodiment, what is described is the case where the image blur compensation mechanism 6 is provided between the lenses 5D and 5E. However, the present invention is not limited to that configuration. The image blur compensation mechanism 6 may be provided in front of the lens group 5 (on the opposite side from the imaging element 4), or right before the imaging element 4; or may be provided at any location between the lenses of the lens group 5. The image blur compensation mechanism 6 may be provided in the camera body unit 2.

According to the above-described embodiment, what is described is the case where the voice coils 15 and 16 are provided on the base section 10, and the magnets 43 and 53 on the prism support portions 41 and 51. However, the present invention is not limited to that configuration. The magnets may be provided on the base section 10, and the voice coils on the prism support portions 41 and 51.

According to the above-described embodiment, what is described is the case where the wedge prisms 42 and 52 are formed integrally with the prism support portions 41 and 51, respectively, with the use of resin or the like. However, the present invention is not limited to that configuration. Instead of either the wedge prism 42 or 52 or both, for example, a wedge prism made of glass may be bonded and fixed to one or both surfaces of a parallel prism that is formed integrally with the prism support portions 41 and 51 with the use of resin or the like. Even in this case, as in the case of the wedge prisms 42 and 52, it is possible to move the incident light substantially in the X-axis and Y-axis directions as the rotor units are rotated.

According to the above-described embodiment, what is described is the case where the rotor units 40 and 50 are disposed on the same plane. However, the present invention is not limited to that configuration. All that is required is that a prism support portion, which supports an outer periphery side of a wedge prism, is formed into a shape whose central angle around a central axis is less than 180 degrees, and that a magnet and a yoke are provided in the prism support portion, and that the wedge prism is so supported as to be rotatable around the central axis. For example, each of rotor units (prism support portions) paired may be disposed on a different plane.

More specifically, as shown in FIG. 6 in which portions corresponding to those in FIGS. 2 to 4 are represented by the same reference symbols, in an image blur compensation mechanism 106, rotor units 140 and 150 are provided. In the rotor units 140 and 150, with respect to the base section 10, wedge prisms 142 and 152 are so provided as to be separated in the Z-axis negative direction. Incidentally, a cover section 120 is formed into a shape suited for the rotor units 140 and 150.

Prism support portions 141 and 151 are formed into a fan shape whose central angle around the central axis L2 is less than 180 degrees. The prism support portions 141 and 151 are disposed on the base section 10 in such a way as to be able to rotate on the same plane through balls 17A to 17C and 17D to 17F.

In the case of the prism support portions 141 and 151, compared with the above-described prism support portions 41 and 51, thick portions 141G and 151G, which are designed to support the wedge prisms 142 and 152, are made thicker toward the Z-axis negative direction sides (the opposite-direction sides from the base section 10).

The prism support portions 141 and 151 support the wedge prisms 142 and 152 on the Z-axis negative direction sides of the thick portions 141G and 151G that are made thicker in such a way that the slopes of the wedge prisms 142 and 152 are different by 90 degrees, and that the wedge prisms 142 and 152 face each other.

In that manner, in the image blur compensation mechanism 106, with respect to the plane on which the prism support portions 141 and 151 are disposed, the wedge prisms 142 and 152 are so provided as to be separated on the Z-axis negative direction sides.

In the image blur compensation mechanism 106, what is formed is a space in which nothing is provided and which extends from the opening 11A of the base section 10 to the wedge prism 142.

Accordingly, the image blur compensation mechanism 106 is effective especially when the prism support portions 141 and 151 and the wedge prisms 142 and 152 cannot be disposed on the same plane due to placement of each component of the camera, the lens group, and the like. In the space in which nothing is provided and which extends from the opening 11A of the base section 10 to the wedge prism 142, another lens may be provided, for example. Therefore, the device as a whole can be made smaller in size.

In another example, as shown in FIG. 7 in which portions corresponding to those in FIGS. 2 to 4 and 6 are represented by the same reference symbols, in an image blur compensation mechanism 206, rotor units 40 and 150 are provided.

In the image blur compensation mechanism 206, wedge prisms 42 and 152 are so disposed as to face each other; the prism support portions 41 and 151, however, are disposed on different planes.

In order to support the prism support portions 41 and 151 on different Z-axis direction planes, a base section 210 includes planes that are different in height in an up-down direction (Y-axis direction) with respect to the central, axis L2; on each of the planes, the prism support portions 41 and 151 are so supported as to be rotatable through the balls 17A to 17C and 17D and 17F. Incidentally, a cover section 220 is formed into a shape suited for the rotor units 40 and 150.

The image blur compensation mechanism 206 is effective especially when the prism support portions 41 and 151 cannot be disposed on the same plane due to placement of each component of the camera, the lens group, and the like.

As for the image blur compensation mechanism 206, in a space in which nothing is provided and which extends from an opening 211A of the base section 210 to the wedge prism 42, another lens may be provided, for example. Therefore; the device as a whole can be made smaller in size.

According to the above-described embodiment, what is described is the case where the rotor units 40 and 50 are three-point supported by the balls 17A to 17C and 17D and 17F, which are concentrically arranged.

The present invention is not limited to that configuration. The balls may not be concentrically arranged as long as the centers of the magnets 43 and 52 placed on the prism support portions 41 and 51 are located inside a triangle connecting the supporting three points.

Figure 8:
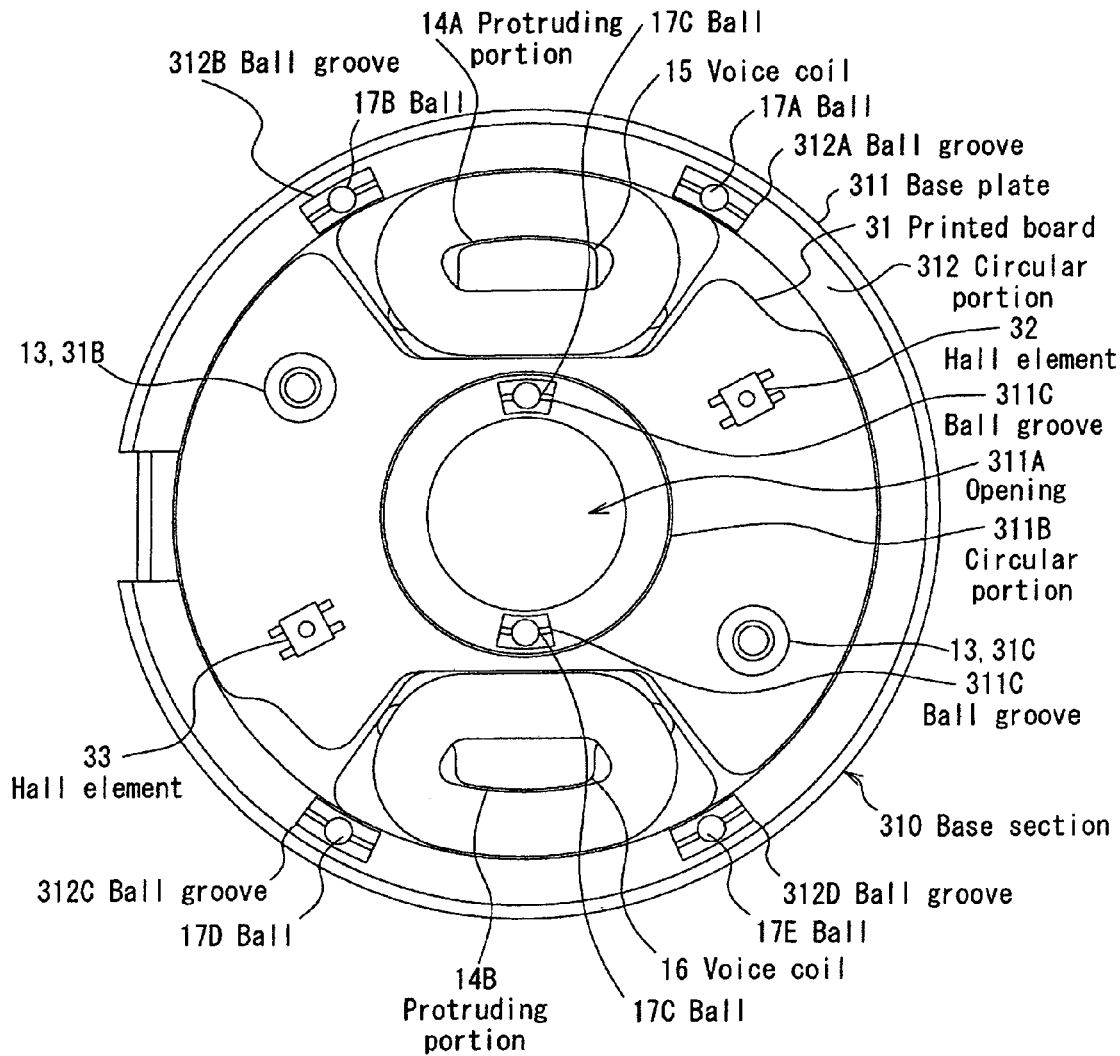
FIG. 8 is a schematic diagram showing the configuration of an image blur compensation mechanism according to another embodiment.

For example, as shown in FIG. 8 in which portions corresponding to those in FIGS. 2 to 4 are represented by the same reference symbols, in an image blur compensation mechanism 306, on a circular portion 312 that is provided near the outer periphery of a base plate 311 of a base section 310, ball grooves 312A to 312D are concentrically provided around the central axis L2.

The ball grooves 312A and 312B are so provided as to be symmetrical about a central line (Y-axis) that passes through the center of the voice coil 15, and to be spaced by a distance longer than the length of the voice coil 15 (X-axis direction), for example.

The ball grooves 312C and 312D are so provided as to be symmetrical about a central line (Y-axis) that passes through the center of the voice coil 16, and to be spaced by a distance longer than the length of the voice coil 16 (X-axis direction), for example.

On a base section 310, a circular portion 311B is provided on a base plate 311 so as to surround an opening 311A, which is provided at the center of the base plate 311 around the central axis L2, and to be equal in Z-axis direction thickness to the circular portion 312.

On the circular portion 311B, ball grooves 311C and 311D are provided on a central line (Y-axis) that passes through the centers of the voice coils 15 and 16 so as to be symmetrical about the central axis L2.

The base section 310 supports one rotor unit (not shown) via the balls 17A to 17C placed in the ball grooves 312A, 312B, and 311C. The base section 310 supports the other rotor unit (not shown) via the balls 17D to 17F placed in the ball grooves 312C, 312D, and 311D. Incidentally, on the rotor units, ball grooves are so provided as to face the ball grooves 312A, 312B, and 311C, and the ball grooves 312C, 312D, and 311D.

In that manner, in the image blur compensation mechanism 306, a rotor unit can be supported in such a way that the centers of the voice coils 15 and 16 are inside a triangle connecting three supporting points of the rotor unit, i.e. the centers of the magnets that are so disposed as to face the voice coils 15 and 16 on the rotor unit are inside the triangle.

According to the above-described embodiment, what is described is the case where the rotor units 40 and 50 are three-point supported by the balls 17A to 17C and 17D to 17F. However, the present invention is not limited to that configuration. All that is required is to support a rotor unit at least at three points. A rotor unit may be supported at four or more points as long as the center of a magnet that is disposed on a prism support portion so as to face a voice coil is located inside a polygon that connect the supporting points.

According to the above-described embodiment, the image blur compensation mechanism 6 is applied to the case where an image of the light passing through the lens group 5 of the camera 1 is moved. However, the present invention is not limited to the above. The image blur compensation mechanism 6 may be used in other optical devices, such as a projection device and a laser device.

For example, when being used for a projection device, the image blur compensation mechanism is placed ahead of an emitting section that emits light; the light emitted from the emitting section is refracted and moved in X-axis and Y-axis directions before being emitted as projection light. When being used for a laser device, the image blur compensation mechanism is placed ahead of a laser section that emits a laser beam; the laser beam emitted from the laser section is refracted and moved in X-axis and Y-axis directions before being emitted.

INDUSTRIAL APPLICABILITY

The present invention can be used for optical devices such as digital cameras.

EXPLANATION OF REFERENCE SYMBOLS

1: Camera
2: Camera body unit
3: Lens barrel unit
4: Imaging element
5: Lens group
6: Image blur compensation mechanism
10: Base section
15, 16: Voice coil
17A to 17F: Ball
18, 19, 44, 46, 54, 56: Yoke
20: Cover section
30: Substrate section
31: Printed board
32, 33: Hall element
40, 50: Rotor unit
41, 51: Prism support portion
42, 52: Wedge prism
43, 45, 53, 55: Magnet
61: Microcomputer
62: Shake detection unit
63: Drive unit
64: Position detection unit
71: X-axis direction gyro sensor
72: Y-axis direction gyro sensor
73, 74: Gyro amplifier
75, 76: Power driver
77, 78: Hall element driver

The invention claimed is:

1. An image blur compensation unit, comprising:
a first and a second refractive element that are disposed along an optical axis of light that is guided to an imaging element after passing through an optical lens, and which rotate with respect to a central axis that goes along the optical axis to refract the light to correct a blur of an image that is guided to the imaging element;
a first support portion that is provided in one region of 180 degrees or less out of two divided regions with respect to the central axis on a plane perpendicular to the central axis, and which supports the first refractive element on an outer periphery side;
a second support portion that is provided in the other region of 180 degrees or less out of the two divided regions, and which supports the second refractive element on an outer periphery side;
a base section that supports the first and second support portions at three or more points on a plane perpendicular to the central axis in such a way that the first and second support portions can rotate around the central axis; and
a first and a second drive mechanism that are respectively placed in regions where the first and second support portions are provided, and which drive the first and second support portions in such a way that the first and second support portions rotate around the central axis only within the regions to rotate the first and second refractive elements, wherein
the first and second drive mechanisms include
a first and a second magnet that are placed on one of the base section or first and second support portions,
a first and a second coil that are placed on the other one of the base section or first and second support portions so as to face the first and second magnets, and use an electromagnetic force that is generated between the first and second magnets and the first and second coils as current is applied to rotate the first and second support portions, and
a first and a second yoke that are placed on the other one of the base section or first and second support portions so as to face the first and second magnets, and use a magnetic force that is generated between the first and second magnets and the first and second yokes to push the first and second support portions against the base section,
the center of the first magnet is located inside a polygon connecting points where the first support portion is supported, and the center of the second magnet is located inside a polygon connecting points where the second support portion is supported.

2. The image blur compensation unit according to claim 1, wherein
the first and second support portions are supported by a surface of the base section on the same plane.

3. The image blur compensation unit according to claim 1, wherein:
adjacent portions of the first and second support portions are cut in such a way as to form a space of a predetermined range around the central axis when the first and second support portions are disposed adjacent to each other; and in order for the first and second refractive elements to be spaced by a predetermined distance and face each other in a direction of the central axis inside the space, the first support portion supports the first refractive element on one end side in the central-axis direction, and the second support portion supports the second refractive element on the other end side, which is opposite from the one end side, in the central-axis direction.

4. The image blur compensation unit according to claim 1, wherein
the first and second support portions are concentrically supported around the central axis at three or more points with respect to the base section.

* * * * *